(12) United States Patent
Shah et al.

(10) Patent No.: US 11,275,756 B2
(45) Date of Patent: Mar. 15, 2022

(54) SYSTEM FOR EXTRACTING, CATEGORIZING AND ANALYZING DATA FOR TRAINING USER SELECTION OF PRODUCTS AND SERVICES, AND A METHOD THEREOF

(71) Applicant: 3LOQ LABS PVT. LTD., Hyderabad (IN)

(72) Inventors: Anirudh Shah, Hyderabad (IN); Saurabh Kumar, Hyderabad (IN); Naveen Kumar, Hyderabad (IN); Sunil Motaparti, Hyderabad (IN)

(73) Assignee: 3LOQ LABS PVT. LTD., Hyderabad (IN)

( * ) Notice: Subject to any disclaimer, the term of this patent is extended or adjusted under 35 U.S.C. 154(b) by 48 days.

(21) Appl. No.: 16/626,743

(22) PCT Filed: Dec. 18, 2018

(86) PCT No.: PCT/IN2018/050848
§ 371 (c)(1),
(2) Date: Dec. 26, 2019

(87) PCT Pub. No.: WO2019/123478
PCT Pub. Date: Jun. 27, 2019

(65) Prior Publication Data
US 2020/0125578 A1    Apr. 23, 2020

(30) Foreign Application Priority Data
Dec. 19, 2017    (IN) .............................. 201741045616

(51) Int. Cl.
*G06F 16/25*    (2019.01)
*G06F 16/28*    (2019.01)

(52) U.S. Cl.
CPC .......... *G06F 16/254* (2019.01); *G06F 16/285* (2019.01)

(58) Field of Classification Search
CPC ............. G06F 11/1451; G06F 9/45558; G06F 16/128; G06F 16/285; G06F 16/254;
(Continued)

(56) References Cited

U.S. PATENT DOCUMENTS 9,818,145 B1 * 11/2017 Finkelstein ........ G06Q 30/0631
10,241,772 B1 *  3/2019 Ning ..................... G06Q 50/01
(Continued)

FOREIGN PATENT DOCUMENTS

WO    2016/053183 A1    4/2016

OTHER PUBLICATIONS

International Search Report and Written Opinion in International Application No. PCT/IN2018/050848, dated Apr. 5, 2019 (7 pages).
(Continued)

*Primary Examiner* — Pierre M Vital
*Assistant Examiner* — Vy H Ho
(74) *Attorney, Agent, or Firm* — Benesch Friedlander Coplan & Aronoff LLP (57) ABSTRACT

The present invention extracts and then analyses data based on a set of communication between an enterprise and a user associated with the enterprise. A system for extracting and analyzing the data comprising: a database and a processor communicatively coupled with the database and an Output Unit. The processor is configured to categorize data present in the database after extraction, associate the data with a set of parameters, and send the associated data to the output unit. The database includes user metadata, interaction data, and interaction metadata and the processor comprises a Data Acquisition Unit, a Data Categorization Unit, and a Model Processing Unit. The Model Processing Unit comprises of a
(Continued)

Habit Formation Unit and a Recommendation Unit. Further, a method for extracting and analyzing data of a user of an enterprise over a pre-defined period of time has also been discussed.

14 Claims, 4 Drawing Sheets

(58) Field of Classification Search
CPC ....... G06F 2201/84; G06F 2009/45583; G06F 2201/815; G06F 16/188; G06F 11/1448; G06F 11/1464; G06F 11/1484
See application file for complete search history.

(56) References Cited

U.S. PATENT DOCUMENTS

| | | | |
|---|---|---|---|
| 10,909,574 B2* | 2/2021 | Atli | G06Q 30/0269 |
| 2013/0246302 A1 | 9/2013 | Black | |
| 2013/0332484 A1* | 12/2013 | Gajic | G06F 16/20 707/770 |
| 2014/0004928 A1* | 1/2014 | Joiner-Congleton | G07F 17/3237 463/25 |
| 2015/0088624 A1* | 3/2015 | Frederick | G06Q 30/0209 705/14.12 |
| 2015/0095278 A1* | 4/2015 | Flinn | G06F 40/30 706/52 |
| 2015/0304432 A1* | 10/2015 | Mallet | G06F 16/955 709/228 |
| 2018/0121987 A1* | 5/2018 | Akkiraju | G06Q 30/0631 |
| 2019/0141125 A1* | 5/2019 | Ogrinz | H04L 67/306 |

OTHER PUBLICATIONS

First Examination Report in Indian Patent Application No. 201741045616, dated Apr. 9, 2019 (5 pages).

* cited by examiner

SYSTEM FOR EXTRACTING, CATEGORIZING AND ANALYZING DATA FOR TRAINING USER SELECTION OF PRODUCTS AND SERVICES, AND A METHOD THEREOF

CROSS REFERENCE TO RELATED APPLICATIONS

This application is a national stage entry of International Patent Application No. PCT/IN2018/050848, filed on Dec. 18, 2018, which claims priority to Indian Application No. 201741045616, filed on Dec. 19, 2017, the contents of which are incorporated herein by reference in their entirety.

TECHNICAL FIELD

The present invention relates to the field of data communication, more specifically, provides a system and a method for generating artificial intelligence (AI) based solutions based on analyzing interaction pattern between an enterprise and a user.

BACKGROUND

The amount of availability of information about goods or services of an enterprise to a user has been increased. Such increased availability of information affects the user attempting to find useful goods or services for selection of sources and choices. Understanding user requirement poses a major challenge in offering curated goods or services to the user. In the recent times, many enterprises have taken steps to ask for feedback from the user in correspondence to the goods or services offered in order to understand the user requirement. However, it is observed that such feedback seeking approach remains inconsistent across all users of the enterprise. This approach also consumes ample amount of time with uncertainty hovering around any positive outcome for the benefits of the user. Therefore, there is a need to understand the user requisites for offering only the useful goods or services to the user or helping the user for easy selection of the useful goods or services.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter.

Its sole purpose to present some concepts of the subject matter in a simplified form as a prelude to the more detailed description that is presented later.

It is therefore a primary objective of this invention to extract and analyze data corresponding to a user based on previous set of interactions of the user with an enterprise.

It is an object of the present invention to extract and analyze data corresponding to a user based on a prediction of a set of interactions of the user with an enterprise.

According to another embodiment of the present invention, a system for extracting and analyzing data of a user over a pre-defined period of time, the system comprising: a database and a processor communicatively coupled with the database and an output unit. The processor is configured to categorize data present in the database after extraction, associate the data based on a set of parameters, and send the associated data to the output unit.

According to an embodiment of the present invention, the processor is configured to extract data present in the database and arrange the extracted data in order and validate the extracted data.

According to an embodiment of the present invention, the database includes user metadata, interaction data, and interaction metadata, and the processor comprises a Data Acquisition Unit, a Data Categorization Unit, and a Model Processing Unit.

According to an embodiment of the present invention, the set of parameters comprises one or more of types of items and one or more of attributes of specific items.

According to an embodiment of the present invention, the Model Processing Unit comprises of a Habit Formation Unit and a Recommendation Unit.

According to an embodiment of the present invention, the Habit Formation Unit is configured to estimate probability of a customer to form a habit using the enterprise's product, and wherein the Recommendation Unit is configured to recommend to the user a feature of the product of the enterprise that maximizes probability of forming the habit.

According to an embodiment of the present invention, a method for extracting and analyzing data of a user of an enterprise over a pre-defined period of time, the method comprising: processing aggregated data to generate user specific variables derived from the extracted data, creating a specified sets of interaction of the user to describe the user's behavior, categorizing the aggregated data of the user based on a time of the interaction of the user, grouping the users based on a set of system operator defined static attributes; and determining performance of the grouped users in respect of the interaction of the user.

According to an embodiment of the present invention, the aggregated data is a set of communication between an enterprise and the users associated with the enterprise.

According to an embodiment of the present invention, the performance of the grouped users is determined to predict the interaction of the user with the enterprise.

According to an embodiment of the present invention, in absence of interaction with the enterprise, a different feature/recommendation is provided to the user for interaction.

According to an another embodiment of the present invention, the data relating to user's behavior is determined based on a function that comprises of probability of interaction of the user with respect to a feature of the enterprise and user's actual behavior with the feature.

According to another embodiment of the present invention, the method comprises prescribing a sequence of features of the enterprise to the user that encourage the user to form a habit, such that the interaction of the user with the feature of the enterprise increases in volume and consistency as well as the interaction of the user with different features of the enterprise increases.

These and other objects, embodiments and advantages of the present invention will become readily apparent to those skilled in the art from the following detailed description of the embodiments having reference to the attached figures, the invention not being limited to any particular embodiments disclosed.

BRIEF DESCRIPTION OF FIGURES

The foregoing and further objects, features and advantages of the present subject matter will become apparent from the following description of exemplary embodiments with reference to the accompanying drawings, wherein like numerals are used to represent like elements.

It is to be noted, however, that the appended drawings along with the reference numerals illustrate only typical embodiments of the present subject matter, and are therefore, not to be considered for limiting of its scope, for the subject matter may admit to other equally effective embodiments.

DETAILED DESCRIPTION

Exemplary embodiments now will be described with reference to the accompanying drawings. The disclosure may, however, be embodied in many different forms and should not be construed as limited to the embodiments set forth herein; rather, these embodiments are provided so that this disclosure will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

It is to be noted, however, that the reference numerals used herein illustrate only typical embodiments of the present subject matter, and are therefore, not to be considered for limiting of its scope, for the subject matter may admit to other equally effective embodiments.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include operatively connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different. It is apparent to a person skilled in the art that the structure may also comprise other functions and structures.

Also, all logical units described and depicted in the figures include the software and/or hardware components required for the unit to function. Further, each unit may comprise within itself one or more components which are implicitly understood. These components may be operatively coupled to each other and be configured to communicate with each other to perform the function of the said unit.

Figure 1:
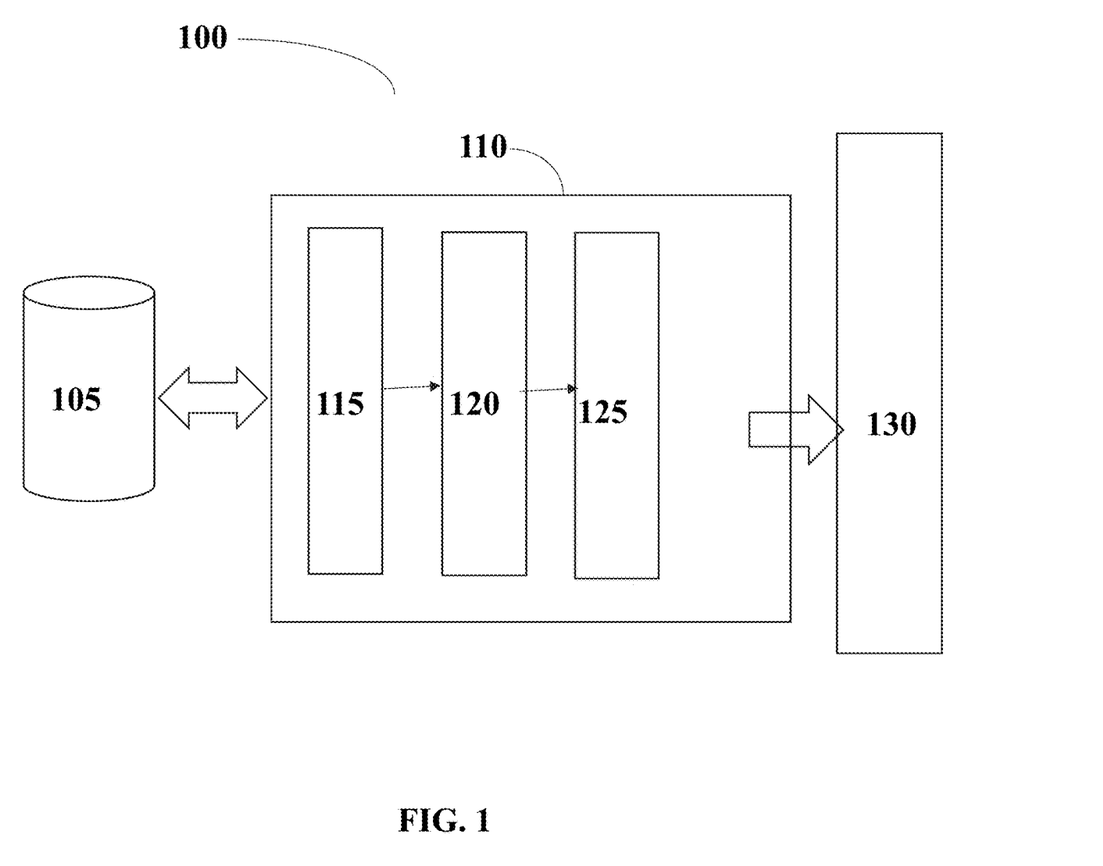
FIG. 1 illustrates a system in which the present invention is implemented according to a first embodiment.

FIG. 1 illustrates a system 100 in which the present invention is implemented. The system 100 comprises a database 105 and a processor 110 communicatively coupled with the database 105 and an Output Unit 130. The processor 110 comprises Data Acquisition Unit 115, a Data Categorization Unit 120, and a Model Processing Unit 125. The Model Processing Unit 125 comprises of a Habit Formation Unit and a Recommendation Unit (not shown in the Figure). It should be understood that the database 105 and the processor 110 may be physically separated from each other or may be embedded together when in operation. The system 100 may be in a network environment (not shown) along with its all other components such as the database 105, the processor 110, and the Output Unit 130. On the other hand, the components of the system 100 such as the database 105, the processor 110, and the Output Unit 130 may be in communication with each of them via separate network interface (not shown). The network interfaces may be network interface cards, switches or routers, Fiber Channel transceivers, InfiniBand-enabled devices, or other devices programmed to transmit and receive messages according to standardized data network protocols. These protocols may include Ethernet for a media access control (MAC) layer, Internet Protocol (IP) for a network layer, and/or User Datagram Protocol (UDP) or Transmission Control Protocol (TCP) for a transport layer.

The database 105 may at least have information about an enterprise, a user in relation with the enterprise and interaction of the user with the enterprise. The information about the enterprise may be, but not limited to, demographic details of the enterprise, historical information of the enterprise, business/revenue information of the enterprise, and number of user associated with the enterprise etc. Further, the information about the user may be, but not limited to, education, nationality, religion, and income etc. The information of the interaction of the user with the enterprise may be, but not limited to, date and time of the interaction, location of interaction, type of interaction, the enterprise product related to the interaction, etc.

In operation, aggregated data present in the database 105 is extracted by the Data Acquisition Unit 115. Data Acquisition Unit 115 arranges the extracted data in order and also authenticates the received extracted data. This arrangement can be done in a pattern such that the extracted data is associated with types of items, attributes of specific items, and/or the like. Upon completion of this extraction, the extracted data is forwarded to the Data Categorization Unit 120. At the Data Categorization Unit 120, data is categorized based on a twofold process. Firstly, the unstructured data components are categorized using a classification system. Secondly, the classified data from the first stage is integrated with additional data to cover other areas, for example logistics, location, transit etc. This categorized data is forwarded from the Data Categorization Unit 120 to the Model Processing Unit 125. In the Model Processing Unit 125, the extracted and categorized data is associated with types of items, attributes of specific items, and/or the like. The output of the Model Processing Unit is user level customized recommendations. This information is sent to Output Unit 130. Once received, the Output Unit 130 notifies the user about the customized information associated with the enterprise.

When the user is availing a service of product from the enterprise, user's demographic details are stored with the enterprise. A unique identifier is assigned to the user by the enterprise. Every time any user engages or interacts with services or products of the enterprise, a new record is created in the database (105) that tracks the time, location (optional), category, duration, metric, and any associated information. Such records for all users and all interactions are collected by the Data Acquisition Unit (115) and stored in the database (105). The Data Categorization Unit (120) analyses the various data fields in each record to assign a category to each record in the database (105). After categorization is completed for all the records in the database (105), the system performs an aggregation of the data on various time windows. Transactions for each user are aggregated for within a pre-defined time window. The users are split into multiple segments based on their demographic profile. Each segment is then passed to the Model Processing Unit (125).

In the Model Processing Unit (125), for each segment, the user engagement data and demographic data is passed to the Habit Formation Unit. The Habit Formation Unit creates habit formation index that is calculated from the engagement data: example formula: weighted combination of: (count of interaction events per time period)+(count of unique event categories interacted with)+(count of unit time windows where at least one interaction event is present)+(aggregated information of any other available metric).

A number of different formula are experimented with before arriving at the final formula for calculating the habit formation index. A lower value on this index signifies a lower probability of the user to have formed a habit of using the enterprise and vice versa.

The time line of the user interaction is divided into 3 windows: observation, hold, check. Observation window: interaction data in this window is used as inputs to the Habit Formation Unit. Hold window: interaction data in this window is discarded to allow the user to build habits. Check window: interaction data in this window is used to calculate the habit formation index of the user.

For each segment, a machine learning based classification model is created that is trained to discriminate between users who have formed a habit and those who haven't formed a habit. The inputs to the model may be, but not limited to, demographic data, aggregate user engagement data across all categories of events from the observation window. The output of the Habit Formation Unit is a probability estimate of how likely a customer is of forming the habit.

In accordance with the subject-matter of the present application a habit can be defined as: A user of an enterprise's product is said to have formed a habit of engaging with the enterprise's product if
1. The customer consistently engages with the enterprise's product at regular periodic intervals
2. The customer uses a higher than average variety of the product's features
3. The customer engages more often than average
4. The estimated probability of the customer NOT engaging the product in the following time-window is less than a pre-defined threshold.

The Recommendation Unit enumerates all the interaction categories that a customer has not used as per the historical interaction data. For each customer and each category, the Recommendation Unit calculates the probability of the customer becoming a habitual user if the customer had interacted with this particular category. The category with the highest probability of habit formation is recommended to the customer and is the final output of the Recommendation Unit.

The Data Acquisition Unit (115), at time of inception gets to know where and in what format all the User metadata and User interaction data is stored in the Enterprise. Following that point, it's job is to streamline the flow of the information into our system. This meta information of whereabouts of the User metadata/Interaction data is gathered at the time of integration. Data Acquisition Unit (115) stores that meta information into the system.

The Data Categorization Unit (120) majorly looks at the unstructured information present in the user's Interaction data and derives meaningful structures and labels to each Interaction happening by each user in the Enterprise. Data Categorization Unit (120) examines each token in specified data fields, disambiguates the intent of each token and assigns a category to each token. Data Categorization Unit (120) enriches the Interaction data by adding more dimensions to it with the help of advanced natural language processing techniques, so that the downstream Recommendation Unit can act on those refined extra dimensions and make more fine grained decisions.

The Model Processing Unit (125) acts on the data ingested by the Data Acquisition Unit (115) and enriched by the Data Categorization Unit (120). The Model Processing Unit (125) is the core that finds patterns of Habit formations and outputs in-time relevant recommendations to the Users, optimizing the combined criterions of relevance, recommendation-conversions and increase in engagement, decease in attrition.

The three units namely, the Data Acquisition Unit (115), the Data Categorization Unit (120), and a Model Processing Unit (125) are all streamlined one after another serially, so that the entire process is one seamless integration. Combined together serving as an Artificial Intelligence (AI) Agent which solves the business level problems of relevant recommendations/conversion/engagement/Attrition.

Figure 2:
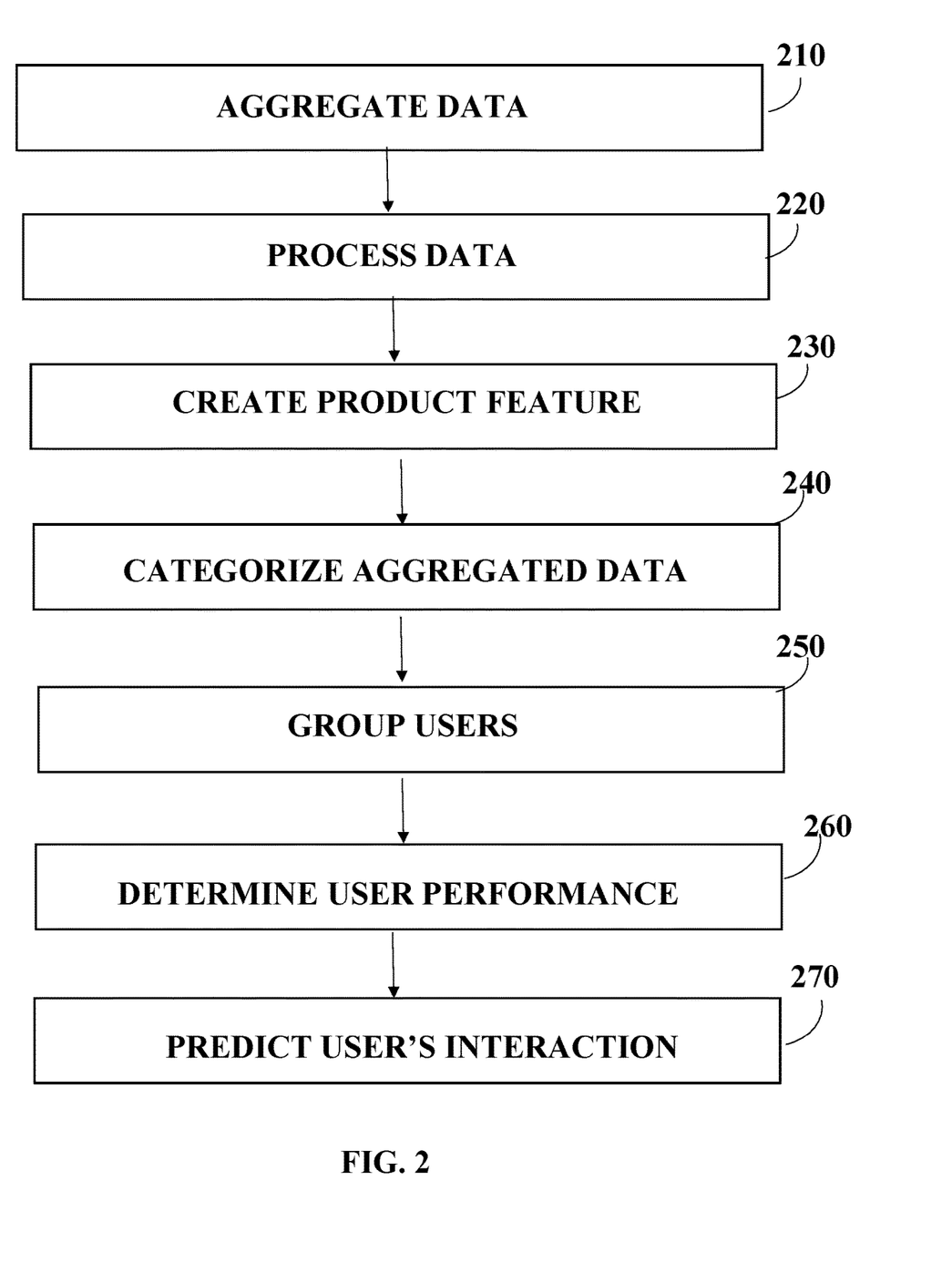
FIG. 2 illustrates a flow chart to carry out a first process according to the first embodiment of the present invention.

FIG. 2 illustrates steps involved in the Model Processing Unit 125 i.e. extracting and analyzing aggregated data of a set of communication between the enterprise and the users associated with the enterprise. The process starts at step 210, based on an aggregation of information. The information of the user may include, but not limited to, time of availability of a user at a particular location, transmit time, demographic details and any other relevant metadata. At step 220, this aggregated data is processed to generate user specific variables derived from the extracted data at the Data Categorization Unit 120. Further, similar derived variables that describe user's behavior or relevant to the user are also aggregated. These are referred to as User specific derived variables, $F_u$. At step 230, every unique type of interaction of the user with the enterprise system, termed as an Event, undergo a process that groups Events into system operator specified sets called Product Features. This grouping is mutually exclusive i.e. one Event is mapped to one Product Feature. A combination of derived variables at user level and the user's interaction matrix with Product Features is used to describe each user's behavior.

A multi-dimension vector ($F_s$) is created for each individual user:

$$F_s = F_u + F_e,$$

where $F_u$: User specific derived variables and $F_e$: User's interaction matrix with Product Feature space (E).

Additionally, at step 240 (Split Timeline), the aggregated data is divided into three categories based on the time related data. For example, the user's last 27 months data is divided into three separate time slots such as—last 27-16 months in one bucket (pre-data), 15-13 months in second bucket (holdout data) and 12-1 months in third bucket (post-data). The pre-data and post-data is used to evaluate user's behavior. However, the holdout data is not used directly. The purpose of the hold-out data is to allow the user time to interact with the enterprise system.

Next, at step 250 (Categorize Users), users are grouped based on a set of system operator defined static attributes, known as Peer Groups. Peer Groups are scored on system operator defined Product or Product Feature based engagement criteria, called Habitual Index. Habitual Index is calculated based on the pre-data and the post-data to categorize the users. During this process, the users may be categorized into two or more categories—habitual user, non-habitual user and other.

Criteria for being a habitual user is defined by an optimization process on Habitual Index that simultaneously minimizes probability of reduction in Habitual Index in the post period and maximizes the probability of progression in Habitual Index in post period. Thus the habitual user is a user whose Habitual Index crosses a learned threshold $\beta$ during the 12-1 months' period, and rest of the users are non-habitual users.

At step 260, performance of at least two user groups are differentiated as following:

$$U_1 \Xi \Sigma_{t \in T_s} \Sigma_{i \in E} g(Wi^*Eit) + \beta > 0$$

$$U_2 \Xi \Sigma_{t \in T_s} \Sigma_{i \in E} g(Wi^*Eit) + \beta \leq 0$$

where $U_1$ is the user group which over the time has become habitual of interacting with the enterprise and is fully aware of the features of the enterprise that best suits their needs, and $U_2$ is the user group which is using the system in a sub optimal manner. i.e., these users are yet to become habitual of the enterprise.

The $U_2$ user group has recommended features of the enterprise which the user is yet to discover and form a habit of interacting with the enterprise. Hence, gradually advancing this $U_2$ user group to $U_1$ user group where, a user's performance, which is measured using the Habitual Index, on system.

At step 270, the determined user's performance as discussed in reference with FIG. 2 are binned into categories to define the post transition probabilities. e.g.

TABLE 1

| Performance-Bins | Habitual Index Level 1 | Habitual Index Level 2 | Habitual Index Level 3 |
| --- | --- | --- | --- |
| Habitual Index Level 1 | 41% | 23% | 35% |
| Habitual Index Level 2 | 7% | 46% | 47% |
| Habitual Index Level 3 | 3% | 32% | 65% |

Based on the data of Table: 1, it is observed that the users belonging to bin Habitual Index Level 1 have 41% probability of remaining in the same bin whereas, 23% progress by default (i.e. they have progressed on their own on the Habitual Index performance scale) to Habitual Index Level 2 and 35% progress to Habitual Index Level 3 and so on. Now a model H is created based on the pre-data information and associating the information with the type of user (Habitual/Non-habitual/Others). In addition, probability is calculated to predict if the user is going to be a habitual user in future based on the above user performance information i.e. given the feature vector of a user $U_i$, $U_1$ user group $p_i$ is calculated as:

$$p_i = H(F_{si})$$

Further, user's behavior data is used over subsequent months to improve the accuracy and precision of the predictions.

Figure 3:
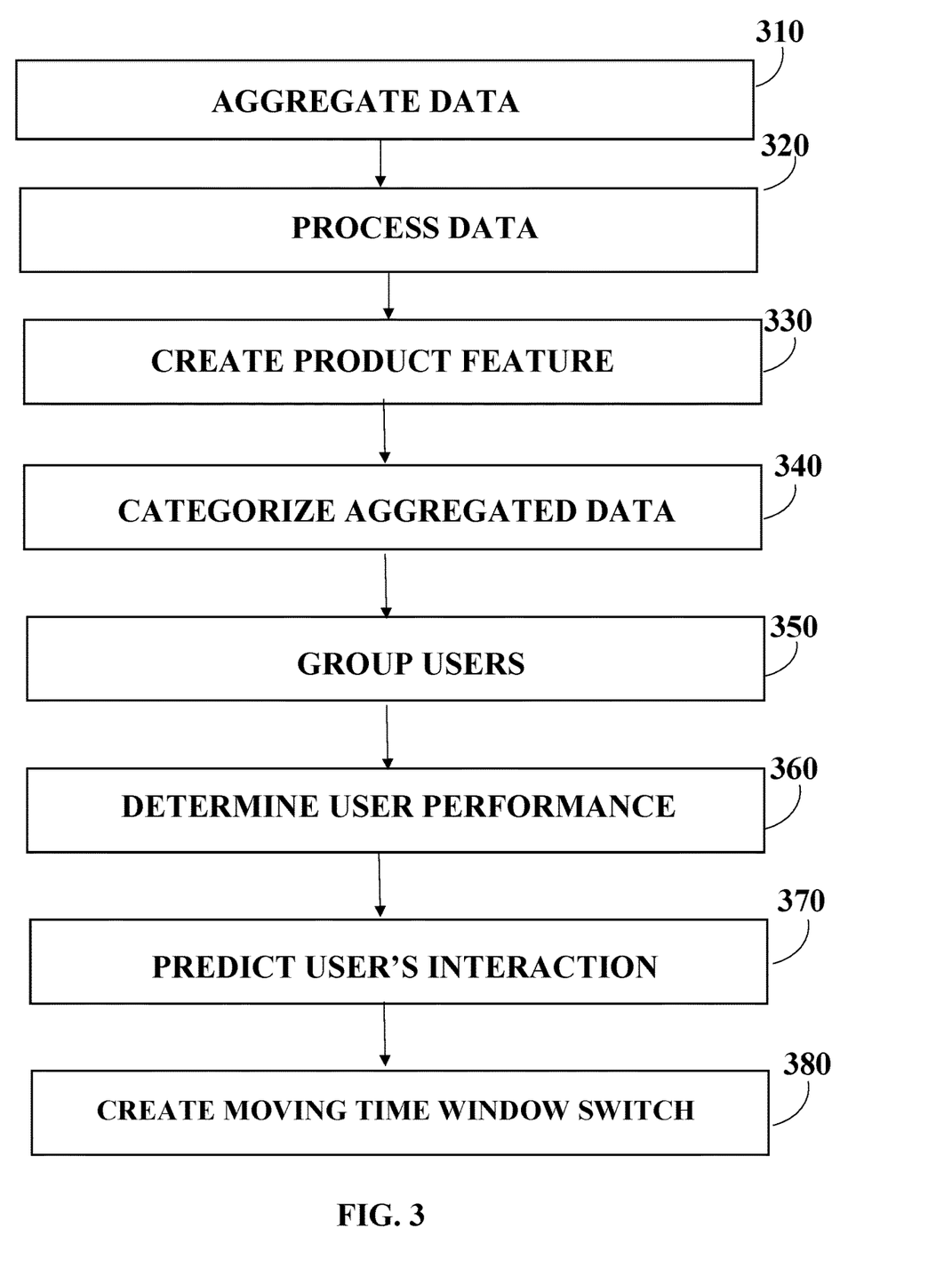
FIG. 3 illustrates a flow chart to carry out a second process according to a second embodiment of the present invention.

FIG. 3 illustrates steps involved in extracting and analyzing data based on of a prediction of a set of communication of the user with the enterprise. In describing the steps involved in this process, the steps which are of similar nature with that of the steps discussed above in reference with FIG. 2 are omitted for the sake of brevity.

At step 380, a moving time window switch is created based on, for example, the user's last 35 months data. This data is divided into multiple phases, for example it may be 27 months for each phase. In the first phase (P1) that is for the first 27 months (starting from 27-1), the data is analyzed, and the input may be the user's behavioral data for the first 27 months, that is the type of feature of the enterprise used for interaction and user's actual performance (e.g., whether interacted with enterprise or not). The user's behavioral data is determined by using a function that comprises of probability of interaction of the user with respect to a feature and user's actual behavior with the feature. Based on these two features, a feedback penalty is given to improve the prediction system, $H(F_{si})$. It is to be noted that the function and penalty are inversely proportional to each other.

Moving to second phase (P2), the data of the user is aggregated during the 2-28 months and the output of P1 are used and analyzed. Similar process may also be executed for the subsequent phases of minimizing the errors that may occur during the entire process.

In this case, for the identified habitual users, their existing behavior is gathered. Such behavior comprises of a set of criteria and a constant value is assigned to each of the features that the user has interacted with the enterprise in past and zero is assigned to the features that he has not interacted with the enterprise in past time. A set of Product Features is also identified along with the identified user's behavior. A score is given to each set of Product Features based on user's actual behavior with the Product Features by using the below equation:

$$p_i = H(F_{si})$$

Based on this, the user's score is calculated for multiple sets with each set comprises of multiple combinations by providing the value to each of the features that the user has not interacted in past. Each combination is termed a future behavior of the user and since multiple combinations are possible, multiple future behaviors are also prescribed.

Figure 4:
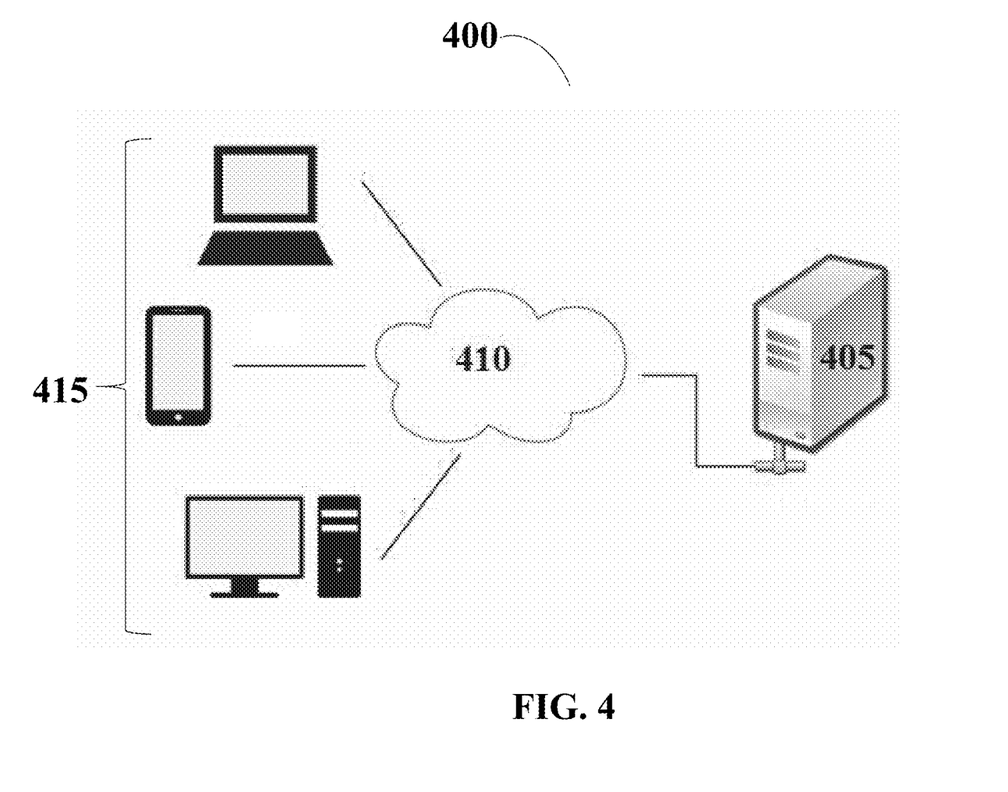
FIG. 4 illustrates a hardware architecture for implementation of the present invention according to an embodiment of the present invention.

FIG. 4 describes a hardware architecture 400 used to implement the present invention. The hardware architecture 400 comprises of a server 405, a network interface 410, and a plurality of user devices 415. Deployment of process carried out based on this invention may be performed in the server 405, the plurality of user devices 415, or a combination of these. The network interface 410 may be network interface cards, switches or routers, Fiber Channel transceivers, InfiniBand-enabled devices, or other devices programmed to transmit and receive messages according to standardized data network protocols. These protocols may include Ethernet for a media access control (MAC) layer, Internet Protocol (IP) for a network layer, and/or User Datagram Protocol (UDP) or Transmission Control Protocol (TCP) for a transport layer. The plurality of user devices 415 may be, for example, but not limited to mobile phone, computer, laptop, PDA, or the like.

The server 405 of the hardware architecture 400 is designed to operate as a centralized system that serves the plurality of user devices 415. The server 405 may perform these operations, for example but not limited to, data managing in required format, generating the feature space, computing the matrix and bins, predicting interaction of a user, or the like.

In the preferred embodiment, the present invention provides benefits of ease of use by creating rules to refine and clean data from a multitude of different resources and increase data accuracy. It further provides ability to handle massively diverse amounts of real-time data combined with built-in analytics libraries.

Moreover, the AI platform is designed with operability in mind, no additional third-party components are required thus simplifying the implementation and eliminating complexities that arise from heterogeneous platforms.

As will be appreciated by one of skill in the art, the present invention may be embodied as a method, and apparatus. Accordingly, the present invention may take the form of an entirely hardware embodiment, a software embodiment or an embodiment combining software and hardware aspects.

It will be understood that each block of the block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the drawings and specification, there have been disclosed exemplary embodiments of the invention. Although specific terms are employed, they are used in a generic and descriptive sense only and not for purposes of limitation of the scope of the invention.

We claim:

1. An Artificial Intelligence (A) system for generating interaction pattern for user's selection of an enterprise's products or services, the system comprising: a server having at least one hardware processor, which executes a plurality of code sections within an AI program stored in a memory to configure the hardware processor to: invoke a Data Acquisition code section to communicate to a database to collect at inception time, location and format information on user metadata and user interaction data which are stored in, the database as aggregated enterprise data of a plurality of users and users' interaction pattern information with an enterprise's products or services, wherein the at least one hardware processor is communicatively coupled with an output unit, wherein the AI program instructions further configure the processor to: invoke a Data Categorization code section to: categorize the aggregated enterprise data after extraction, examine unstructured information present in the user's interaction data and derives structures and labels to each Interaction partook by each user in the Enterprise, examine each token in specified data fields, disambiguates an intent of each token and assigns a category to each token, enriches the user Interaction data by adding more dimensions with a help of advanced natural language processing techniques, wherein the user Interaction data downstream being processed with refined extra dimensions and with more fine grained decisions after the categorization; invoke a Model Processing code section to associate the extracted categorized aggregated enterprise data with types of items, wherein attributes of specific items which has been categorized are based on a set of parameters unique to the user's interaction pattern as associated data, and send through a network interface card, the associated data which is unique to the user's interaction pattern as customized recommendations to the output unit for transmission to a user device, wherein the customized recommendations enable the user to select via the user device, products or services from the enterprise that best matched to user's requirement and consistent to user's actual behavior.

2. The Artificial Intelligence (AI) system as claimed in claim 1, wherein the hardware processor is configured to: invoke the model processing code section to extract the aggregated enterprise data present in the database; and arrange the extracted data into categories in order and validate the extracted data.

3. The Artificial intelligence (AI) system as claimed in claim 1, wherein the database includes user metadata, interaction data, and interaction metadata.

4. The Artificial Intelligence (AI) system as claimed in claim 1, wherein the Model Processing code section comprises of the Habit Formation code section and a Recommendation code section, wherein the Habit Formation code section is configured to estimate probability of a customer to form a habit using the enterprise's product, and wherein the Recommendation code section is configured to recommend the user a feature of the product of the enterprise that maximizes probability of forming the habit.

5. A method implementing an Artificial Intelligence (AI) machine for generating interaction pattern for user's selection of an enterprise's products or services, the method comprising executing by at least one hardware processor, a plurality of code sections within an AI program stored in a memory to configure the hardware processor to perform steps comprising: invoking a Data Acquisition code section to communicate to a database to collect at inception time, location and format information on user metadata and user interaction data which are stored in the database as aggregated enterprise data of a plurality of users and users' interaction pattern information with an enterprise's products or services; invoking a Data Categorization code section to categorize the aggregated enterprise data after extracting stored aggregated enterprise data of a plurality of users and users' interaction pattern information with an enterprise's products or services; examining unstructured information present in the user's interaction data and derives structures and labels to each interaction partook by each user in the Enterprise, examining each token in specified data fields, disambiguates an intent of each token and assigns a category to each token, enriching the user Interaction data by adding more dimensions with a help of advanced natural language processing techniques, wherein the user interaction data downstream being processed with refined extra dimensions and with more fine grained decisions after the categorization; invoking a Model Processing code section to associate the extracted categorized aggregated enterprise data with types of items, wherein attributes of specific items which has been categorized are based on a set of parameters unique to the user's interaction pattern as associated data, and sending through a network interface card, the associated data which is unique to the user's interaction pattern as customized recommendations to the output unit for transmission to a user device, wherein the customized recommendations enable the user to select via the user device, products or services from the enterprise that best matched to user's requirement and consistent to user's actual behavior.

6. The method as claimed in claim 5, wherein the aggregated enterprise data is a set of communication between the enterprise and the plurality of users associated with the enterprise.

7. The method as claimed in claim 5, wherein the performance of the plurality of users who were grouped is determined to predict the interaction of the users with the enterprise.

8. The method as claimed in claim 5, wherein the method comprises creating a feedback penalty based on the type of feature of the enterprise used for interaction and user's actual interaction with the enterprise.

9. The method as claimed in claim 5, wherein the categorized data relating to user's behavior is determined based on a function that comprises of probability of interaction of the user with respect to a feature of the enterprise and the user's actual behavior with the feature.

10. The method as claimed in claim 5, comprising processing the aggregated enterprise data of the plurality of users and the users' interaction pattern information to generate user specific variables derived from the extracted enterprise data.

11. The method as claimed in claim 10, comprising creating a specified set of interactions of a user to describe the user's behavior according to the interaction pattern information with the enterprise's products or services.

12. The method as claimed in claim 11, comprising categorizing the aggregated enterprise data based on a time window of the interaction pattern of the user with the enterprise's products or services.

13. The method as claimed in claim 12, comprising grouping the plurality of users based on a set of system operator defined static attributes according to the users' interaction pattern information with the enterprise's products or services.

14. The method as claimed in claim 13, comprising determining performance of the plurality of users who were grouped in respect of the interaction pattern of the users.

* * * * *